United States Patent [19]

Burkholder

[11] Patent Number: 4,600,216
[45] Date of Patent: Jul. 15, 1986

[54] VEHICLE STEERING AND SUSPENSION SYSTEM

[75] Inventor: Dennis L. Burkholder, Etowah, N.C.

[73] Assignee: John Shuttleworth, Hendersonville, N.C.

[21] Appl. No.: 732,093

[22] Filed: May 9, 1985

[51] Int. Cl.$^4$ .............................................. B62D 9/02
[52] U.S. Cl. .................................... 280/772; 180/210; 280/6.11; 280/95 R; 280/112 A
[58] Field of Search .................. 280/772, 112 A, 6.11, 280/267, 269, 282, 93, 95 R, 96, 673, 675; 180/41, 210, 217

[56] References Cited

U.S. PATENT DOCUMENTS

| | | | |
|---|---|---|---|
| 2,260,102 | 10/1941 | Freret | 280/772 |
| 2,887,322 | 5/1959 | DeMonge | 280/112 A |
| 3,237,961 | 3/1966 | McMullen | 280/772 |
| 3,964,563 | 6/1976 | Allen | 280/6.11 |
| 4,008,199 | 5/1978 | Trautwein | 280/112 A |
| 4,020,914 | 5/1977 | Trautwein | 180/210 |
| 4,050,710 | 9/1977 | Flaig | 280/112 A |
| 4,072,925 | 2/1978 | Bright | 280/772 |
| 4,132,435 | 1/1979 | Wilson | 280/772 |
| 4,469,344 | 9/1984 | Coil | 280/269 |
| 4,546,997 | 10/1985 | Smyers | 280/95 R |

FOREIGN PATENT DOCUMENTS

E 6947  8/1956  Fed. Rep. of Germany ... 280/112 A

Primary Examiner—John J. Love
Assistant Examiner—Everett G. Diederiks, Jr.
Attorney, Agent, or Firm—Shefte, Pinckney & Sawyer

[57] ABSTRACT

A three-wheeled vehicle steering and suspension system includes two support assemblies for two opposed front steerable wheels, the support assemblies each having a tubular housing welded to the vehicle frame, a cylindrical tube rotatably supported within the housing and a cylindrical rod slidably supported within the rotatable tube. Each rotatable tube is affixed at its outer end to the upright support assembly for one of the vehicle wheels and at its inner end to a shock-absorbing member for biasing the wheels into road contact and permitting independent movements thereof to adapt to road undulations. Each sliding rod is affixed at its outer end to the vertical turning shaft of the upright support assembly of one of the wheels and at its inner end to a reciprocal steering linkage for actuating synchronous turning movements of the wheels. In one embodiment, the shock absorbers are connected to opposed crank arms on a connecting shaft arrangement which is drivenly connected to the steering linkage for actuating opposed upward and downward vertical movements of the steerable wheels for causing leaning of the vehicle frame and body upon each turning movement thereof in the direction of vehicle turning.

22 Claims, 9 Drawing Figures

VEHICLE STEERING AND SUSPENSION SYSTEM

BACKGROUND OF THE INVENTION

The present invention relates generally to systems for steering and suspension of the steerable wheels of vehicles and more particularly to such systems adapted for three-wheeled vehicles for inducing leaning of the vehicle frame during turning of the vehicle.

In recent years, the increasing costs of gasoline have produced a substantial amount of activity toward the development of more efficient, compact and lighter weight vehicles. While such development work has predominantly been devoted to the modification and improvement of conventional automotive vehicles, some activity has been devoted to the development of generally unconventional vehicles. For instance, three-wheeled vehicles offer advantages and design possibilities substantially unavailable with conventional automotive vehicles in terms of greater possible reduction of the weight of the overall vehicle, reduced power requirements, a normally lesser rolling resistance resulting from the fewer number of wheels utilized, a wider and more varied range of aerodynamic exterior body configurations, etc., all of which permit the achievement of substantially increased operational efficiencies over more conventional vehicles. Furthermore, three-wheeled vehicles make available rather unconventional engineering possibilities in the design of the vehicle steering and suspension arrangements to improve the stability of vehicle handling and turning capabilities.

Conventional personal automotive vehicles are known to suffer significant deficiencies in steering and general handling capability due to the steering and suspension systems typically employed therein. As is well known, during the turning of a conventional automotive vehicle, centrifugal force acts upon the vehicle radially outwardly of the turn creating a tendency of the vehicle to roll about an axis extending longitudinally of the vehicle. Conventionally, this problem is brought within acceptable limits by the construction of steering and suspension systems having a roll axis relatively low to the ground and the rigidifying of the suspension system with "anti-sway" or similar arrangements. However, the tendency of the vehicle to roll during turning still exists in these vehicles, the primary effect of such steering and suspension arrangements being to require greater centrifugal forces to initiate roll.

In the past, various types of vehicle steering and suspension systems have been proposed to improve vehicle handling by counteracting centrifugal forces during turning by mechanically providing for the leaning of the vehicle radially inwardly of turns correspondingly to shift the center of gravity of the vehicle inwardly. See, for example, U.S. Pat. Nos. 1,283,942; 2,029,735; 2,053,294; 2,260,102; 2,493,817; 3,447,623; 3,746,118; 3,964,563; 4,020,914; 4,072,325; 4,088,199; and 4,360,224. Mechanically-induced vehicle leaning is perhaps best adapted to three-wheeled vehicles, the above-referenced U.S. Pat. No. 3,964,563 disclosing one particular proposed arrangement for this purpose which employs a mechanism intercoupling two transversely-spaced wheels for automatic opposed reciprocatory pivotal movement upwardly and downwardly for inducing vehicle leaning inwardly of any turning movement of the vehicle.

The present invention provides a novel steering and suspension system characterized by its compact, light-weight and simple construction so as to be particularly adapted for use in three-wheeled vehicles and which, in one embodiment thereof, provides for the inducement of leaning of the vehicle during turning to improve the handling stability of the vehicle.

SUMMARY OF THE INVENTION

Broadly speaking, the steering and suspension system of the present invention may be adapted to any wheeled vehicle having a vehicle frame, two steerable wheels mounted on opposite transverse sides thereof, and at least one other wheel mounted on the frame at a longitudinal spacing from the steerable wheels. Briefly described, the steering and suspension system includes respective support assemblies for the steerable wheels pivotably mounted independently at the opposite sides of the frame about respective generally horizontal axes, each support assembly having a tubular housing rigidly fixed to the vehicle frame, a tube rotatably supported co-axially within the tubular housing to define the respective horizontal pivot axis, and a support arm fixed to the rotatable tube and operably connected to the respective steerable wheel for vertical movement of the arm and the wheel integrally with rotational movement of the tube. Respective biasing assemblies are affixed independently to the rotatable tubes for movement therewith and are operatively connected with the vehicle frame to urge the support assemblies and the steerable wheels into an equilibrium position vertically with respect to the frame and for yielding to permit independent pivotal movements of the support assemblies and corresponding vertical movements of the steerable wheels. A steering linkage is provided for controlling synchronous corresponding turning movements of the steerable wheels about respective generally vertical axes generally perpendicular to the aforementioned horizontal axes. The steering linkage includes a connecting rod assembly operatively connected to both steerable wheels for reciprocatory movement for actuating the turning movement thereof, the connecting assembly including respective steering rods supported co-axially within the rotatable tubes for synchronous corresponding longitudinal reciprocal movements therein to actuate the turning movement of the steerable wheels.

In one embodiment of the present invention, a connecting arrangement is affixed respectively to each support assembly and is arranged for reciprocatory movement for actuating opposed, substantially equal pivotal movements of the support assemblies and corresponding opposed vertical movements of the steerable wheels for inducing leaning of the vehicle frame. In such embodiment, the connecting arrangement includes a pair of link arms each rigidly affixed to a respective one of the rotatable tubes, a pair of shock absorber links each pivotably affixed at one end thereof to a respective one of the link arms, a pair of crank arms each pivotably affixed to a respective one of the shock absorber links, and a first shaft arrangement rotatably mounted on the vehicle frame and rigidly affixed with each of the crank arms at a substantially 180 degree spacing about the rotation axis. The steering linkage includes a rotatable steering member, a second shaft rotatably supported on the frame and operatively connected with the steering member for reciprocal rotational movements upon corresponding rotational movements of the steering member, a rack and pinion assembly operatively connected with the second shaft for longitudinal reciprocation upon corresponding rotational movements of the second shaft, and a tie rod assembly pivotably affixed to the rack and pinion assembly and also pivotably affixed respectively to the steering rods supported within the rotatable tubes for actuating corresponding longitudinal movements of the steering rods upon longitudinal movements of the rack and pinion assembly. An actuating arrangement provides operative association between the connecting arrangement and the steering linkage to actuate the reciprocatory movements of the connecting arrangement upon the turning movements of the steerable wheels to actuate the opposed vertical movement of the wheels proportionately to the degree of their turning to effect upward movement of the steerable wheel inwardly of the direction of turning and equivalent downward movement of the other steerable wheel. The actuating arrangement in this embodiment includes a gear drive arrangement which drivingly interconnects the first shaft arrangement with the steering shaft to produce synchronous rotational movement thereof. In this manner, reciprocal turning movements of the steering linkage are transmitted through the gear drive to actuate corresponding movements of the connecting arrangement to produce leaning of the vehicle frame in the direction of turning proportionately to the degree thereof. Furthermore, the shock absorber links act as the aforementioned biasing assemblies to yield independently to permit independent pivotal movement of the support assemblies and corresponding vertical movements of the steerable wheels to accommodate normal road undulations.

In a second embodiment of the invention, the connecting and actuating arrangements are not utilized whereby this embodiment of steering and suspension system does not operate to induce leaning of the vehicle frame. The support assemblies in this embodiment are also arranged generally co-axially about a generally horizontal axis extending transversely of the frame. The biasing assemblies are provided by respective link arms each rigidly affixed to a respective one of the rotatable tubes and by respective elastic bungee cords each extending between a respective one of the link arms and the vehicle frame to independently urge the link arms and their respective support assemblies into the aforementioned equilibrium position and to independently expand and contract upon rotational movements of the link arms during corresponding vertical movements of the respective steerable wheels to accommodate road undulations in the same manner as the shock absorber links of the first described embodiment. As with the first embodiment, the steering linkage also utilizes a rotatable steering member and steering shaft, a rack and pinion arrangement operably connected therewith, and a tie rod arrangement connecting the rack and pinion arrangement with the steering rods for actuating the turning movement of the steerable wheels.

In each embodiment of the present invention, each support arm assembly includes an idler arm pivotably affixed to the tubular housing mounted on the vehicle frame and operatively connected pivotably with the respective steerable wheel for maintaining the caster thereof substantially constant during upward and downward movements of the wheel. Each steerable wheel is further provided with an annular flange thereon and with a braking arrangement having a caliper assembly associated with the annular flange for selective movement into and out of frictional engagement therewith for selectively slowing or preventing rotation of the steerable wheels.

DESCRIPTION OF THE PREFERRED EMBODIMENT

Figure 1:
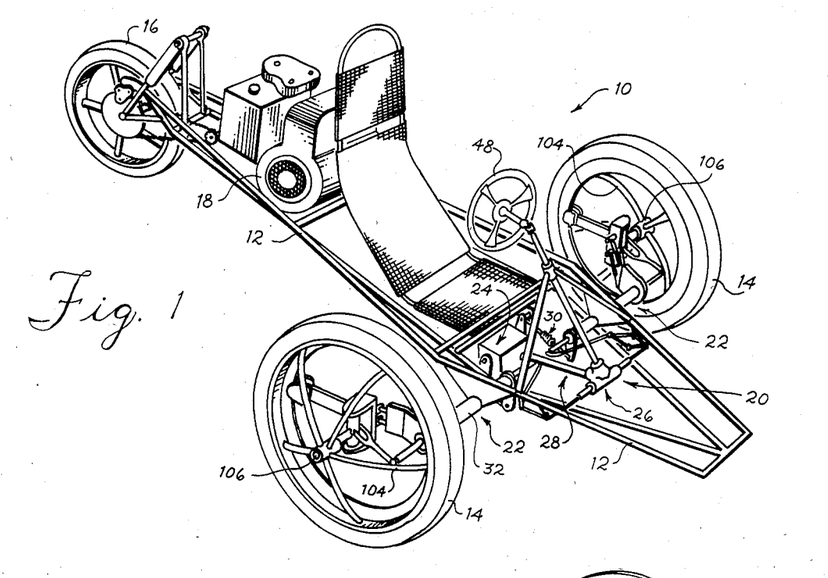
FIG. 1 is a perspective view of a three-wheeled vehicle including a steering and suspension system according to one embodiment of the present invention.

Referring now to the accompanying drawings and initially to FIG. 1, the present invention is illustrated in its preferred embodiment in a three-wheeled vehicle indicated at 10. The vehicle 10 includes a multi-tubular longitudinal frame 12 constructed of a welded network of metal tubing, preferably a chrome molybdenum alloy and/or lightweight steel tubing or another lightweight metal tubing such as aluminum. Preferably, a streamlined, aerodynamic body (not shown) is mounted on and encloses a frame 12. Two steerable wheels 14 are mounted on opposite sides of the frame 12 at its front end and a single non-steerable wheel 16 is mounted centrally of the frame 12 at its rear end longitudinally spaced from the steerable front wheels 14. The wheels 14,16 are of relatively small width and relatively large diameter, such as motorcycle wheels, to reduce vehicle rolling resistance. A gasoline-powered engine 18, preferably a motorcycle engine of the two cylinder, four cycle type, is also mounted on the frame 12 at its rear end and is operatively associated with the rear wheel 16 for driving operation thereof. The structure and operative relationships of the body and frame 12, the rear wheel 16, and the engine 18 form no part of the present invention, other than in providing the structural environment in which the present invention is preferably embodied, and accordingly, such structures are only generally illustrated and described herein to the extent necessary to facilitate a complete and enabling disclosure of the present invention.

The present invention resides in a novel steering and suspension system for the two steerable front wheels 14, which assembly is indicated generally in FIG. 1 at 20. The steering and suspension assembly 20 basically constitutes a mechanical arrangement by which steering operation of the two front wheels 14 actuates leaning of the vehicle frame 12 from a normally upright disposition toward the direction radially inwardly of the particular turn to cause a corresponding shifting of the center of gravity of the vehicle better enabling it to counteract and resist centrifugal and roll forces created during such turning and thereby to provide safer, more secure, and comfortable vehicle handling. The steering and suspension assembly 20 is further and more particularly arranged for actuating such leaning to a degree in each turning movement of the vehicle in direct proportionate relation to the degree of vehicle turning. As used herein, the term "degree of vehicle turning" and variations of such term denote the amount of sharpness of vehicle turning as inversely related to the turning radius, a higher degree of vehicle turning being required for smaller radius turns of the vehicle and conversely a lower degree of vehicle turning being required for larger radius turns.

With reference to FIG. 1, the steering and suspension assembly 20 basically includes two support assemblies 22 pivotably mounted at opposite transverse sides of the front end of the frame 12 and carrying the two front wheels 14 for rotation about their respective axes and for turning transversely thereof, and a connecting arrangement indicated generally at 24 mounted to the frame 12 extending between and affixed respectively to each support assembly 22 and arranged for reciprocatory movement for actuating opposed, substantially equal pivotal movement of the support assemblies 22. A steering linkage, indicated at 26, is operatively connected with both wheel support assemblies 22 for actuating cooperative turning movement of the front wheels 14. An actuating arrangement, indicated in FIG. 1 at 28, provides operative association between the connecting arrangement 24 and the steering linkage 26 for actuation of the reciprocatory movement of the connecting arrangement 24 upon steering operation of the steering linkage 26 to actuate the opposed pivotal movement of the support assemblies 22 in direct proportion to the degree of vehicle turning variably to effect upward pivotal movement of the support assembly 22 inwardly of the particular turn and equivalent downward pivotal movement of the other wheel support assembly 22 outwardly of the particular turn. The connecting arrangement 24 is particularly constructed to include respective biasing assemblies 30 by which the connecting arrangement 24 is affixed respectively to the wheel support assemblies 22 for urging the support assemblies 22 into respective equilibrium dispositions relative to the connecting arrangement 24 for pivotal movement of the support assemblies 22 upon and with the reciprocatory movement of the connecting arrangement 24 and further the biasing assemblies 30 are yieldable for permitting independent pivotal movement of each wheel support assembly 22.

Figure 2:
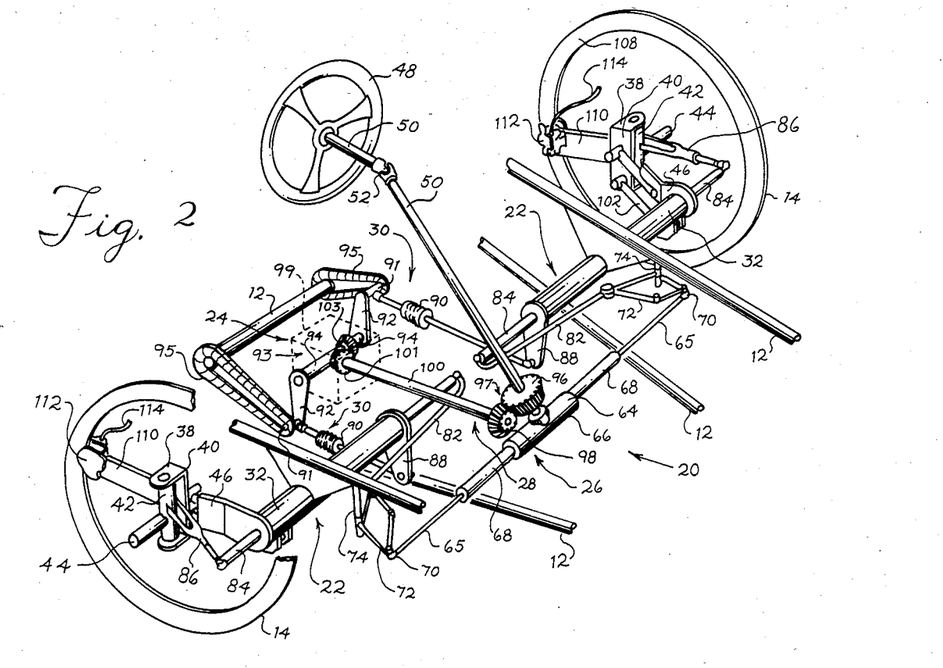
FIG. 2 is a detailed perspective view of the steering and suspension system of FIG. 1.
Figure 3:
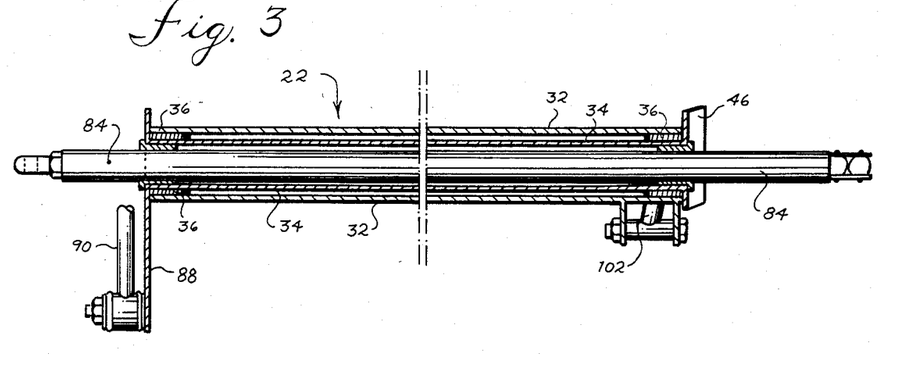
FIG. 3 is a vertical cross-sectional view of one wheel support assembly of the steering and suspension system of FIG. 2 taken along line 3—3 thereof.

Referring now to FIGS. 2 and 3, each support assembly 22 includes a cylindrical tubular housing 32 rigidly affixed by welding to a cross member of the vehicle frame 12 at the respective transverse side thereof so that the tubular housings 32 extend transversely of the frame 12 substantially co-axially with one another about a substantially horizontal axis. Each tubular housing 32 has a cylindrical tube 34 of a slightly smaller diameter and slightly greater length rotatably journaled co-axially in the tubular housing 32 by bearings 36 (FIG. 3) with the ends of the cylindrical tube 34 extending slightly outwardly from the tubular housing 32. An upright wheel support member 38 is provided for each steerable wheel 14 and includes a generally C-shaped bracket 40 which rotatably supports an upright tubular shaft 42 for rotation about a substantially vertical axis.

A spindle 44 extends perpendicularly outwardly from the tubular shaft 42 and provides the axle on which the hub of the associated steerable wheel 14 is rotatably mounted. A trailing support arm 46 is rigidly affixed at one end thereof to the outwardly extending end of each tube 34 and extends rearwardly and slightly upwardly therefrom and is pivoted at its opposite end to the bracket 40 of the associated upright support member 38 for the respective steerable wheel 14. In this manner, each steerable wheel 14 is supported by its associated upright support member 38 and support arm 46 for reciprocal pivotal movement upwardly and downwardly in a substantially vertical path integrally with corresponding rotational movements of the associated tube 34 about its horizontal axis.

The steering linkage 26 includes a conventional steering wheel 48 rigidly affixed to a steering shaft 50 rotatably journaled in the vehicle frame 12 for reciprocal rotational turning operation by an operator of the vehicle. The steering shaft 50 is jointed intermediately along its length by a universal joint 52 and the opposite end of the steering shaft 50 extends into the housing 64 of a conventional rack and pinion unit 66 fixedly welded transversely to the vehicle frame 12 centrally thereof and forwardly of the support assemblies 22. The pinion gear (not shown) of the rack and pinion unit 66 is rigidly affixed to such end of the steering shaft 50 for effecting longitudinal reciprocal movements of the meshing toothed rack 68 upon corresponding rotational movements of the shaft 50. The ends of the toothed rack 68 extend outwardly from opposite ends of its housing 64, and have co-linear extension rods 65 affixed to the opposite ends of the rack 68, the extension rods 65 being pivotably affixed respectively by ball and socket connections 70 to the forward apexes of a pair of double-armed trusses 72 which are pivotably mounted on upright pins 74 welded to longitudinal side frame members transversely spaced from one another at opposite sides of the vehicle frame 12 for pivotal movement of the trusses 72 about the parallel vertical axes defined by the pins 74. The rearward apex of each truss 72 is pivotably connected to a respective tie rod 82 which extends therefrom to a location adjacent the inward end of the rotatable tube 34 at the corresponding side of the vehicle frame 12. The extending end of each tie rod 82 is pivotably mounted to a respective cylindrical rod 84 which slidably extends co-axially through the adjacent rotatable tube 34 and outwardly from its opposite outward end. The outwardly extending end of each cylindrical rod 84 is pivotably mounted by chain links 85 to a trailing clevis 86 which is pivotably mounted about a horizontal axis to opposite sides of the upright shaft 42 of the associated upright support member 38. In this manner, the various described components of the steering linkage 26 are arranged for reciprocal movements, either rotationally or longitudinally as the case may be, upon turning rotation in different directions of the steering wheel 48 to actuate synchronous corresponding reciprocal movements of the sliding rods 84 through the rotatable tubes 34 to effect turning movement of the steerable wheels 14 about the vertical axes of the upright shafts 42 via the clevises 86 in the same direction as the turning of the steering wheel 48 (see FIG. 4).

The connecting arrangement 24 includes a pair of link arms 88 each rigidly affixed at one end to and extending downwardly from the inwardly extending end of a respective one of the rotatable tubes 34. The downwardly extending end of each link arm 88 is pivotably affixed to one end of a respective shock absorber link assembly 90, which may preferably be a conventional motorcycle or similar shock absorber. The shock absorbers 90 extend rearwardly in generally parallel relation to one another and are each affixed to one end of a respective crank arm 92, the opposite ends of the crank arms 92 respectively being affixed rigidly to the output shaft 94 of a conventional bevel gear right angle drive assembly 93 rotatably supported transversely on the vehicle frame 12, with the crank arms 92 being spaced from one another substantially 180 degrees about the rotational axis of the shaft 94.

Normally, as will be understood, the weight of the vehicle 10 borne by the suspension system when the vehicle is resting on a road surface or the like acts through the support assemblies 22 and the link arms 88 to effect some degree of preloaded compression of the shock absorbers 90 so that they act in turn against the support assemblies 22 to pivot them and the associated steerable wheels 14 into pivoted dispositions in equilibrium relative to the vehicle frame 12 and relative to the reciprocal disposition of the components of the connecting arrangement 24. Elastic bungee cords 95 are trained about spools 91 affixed to the crank arms 92 and about an adjacent cross-member of the vehicle frame 12 to supplement the shock absorbers 90 as hereinafter described. In this manner, the described components of the connecting arrangement 24 join the two support assemblies 22 for reciprocal movement of the connecting arrangement 24 and the support assemblies 22 substantially as a unit upon actuation of rotational movement of the shaft 94 to achieve opposed vertical movements of the steerable wheels 14 to cause to lower the side of the frame 12 at which the corresponding wheel 14 is vertically raised and to cause to rise the side of the frame 12 at which the corresponding wheel 14 is lowered, resulting in the frame 12 and the vehicle body being induced to lean about a central horizontal axis extending longitudinally of the frame 12 toward the lowered side of the frame 12 and thereby shifting the center of gravity of the vehicle correspondingly toward such side thereof. (See FIGS. 4 and 5). The shock absorbers 90 further act as a springing or biasing medium for permitting independent pivotal movement of the two support assemblies 22. Thus, without rotation of the shaft 94, the shaft 94 act essentially as part of the vehicle frame 12 to rigidly retain the rearward ends of the shock absorbers 90 so that they will operate biasingly to be compressed or extended to permit independent pivotal movements of the support assemblies 22 for independent upward and downward movements of the steerable wheels 14 to react to and accommodate normal undulations in road surfaces to properly maintain the wheels 14 in road surface contact. (See FIGS. 6 and 7).

The actuating arrangement 28 is provided by a driving gear arrangement 97 and by the bevel gear right angle drive assembly 93 which drivingly connects and transmits rotational movement from steering shaft 50 to the shaft 94. The driving gear arrangement 97 includes a driving gear 96 rigidly fixed on the shaft 50 adjacent its connection with the rack and pinion unit 66 and a bevel gear 98 in drivenly meshing engagement with driving gear 96 fixed on the forward end of the input drive shaft 100 of the bevel gear right angle drive assembly 93. The shaft 100 extends rearwardly from the steering shaft 50 intermediately of the shock absorbers 90 and the crank arms 92 and extends into and is rotatably supported by the gear housing 99 of the bevel gear right angle drive assembly 93 in perpendicular relation to the output shaft 94. A bevel gear 101 is fixed to the end of the drive shaft 100 interiorly within the housing 99 and meshes with another bevel gear 103 fixed to the output shaft 94. In this manner, steering operation of the steering linkage 26 to effect turning of the steerable wheels 14 in any given direction effects also a corresponding reciprocation of the connecting arrangement 24 and the support assemblies 22 to cause upward movement of the wheel 14 inwardly of the direction of turning and downward movement of the wheel 14 outwardly thereof to cause the vehicle frame 12 and body to lean toward the direction of turning. As will be understood, the relative sizes of the gear 96,98,101,103 are chosen according to conventional known parameters to provide a predetermined desired proportionate relationship between the degree of vehicle turning and the degree of vehicle leaning induced thereby.

Of course, those persons skilled in the art will readily recognize that many other differential gear arrangements may be equally well employed instead of the bevel gear right angle drive assembly 93 to facilitate the operative connection between the biasing arrangements 30 and the driving connection between the steering linkage 26 and the connecting arrangement 24. For instance, it is contemplated that a differential gear arrangement 293 of the type shown in FIG. 9 may be employed. The differential gear arrangement 293 provides a pair of output shafts 294 coaxially aligned end-to-end with the inward end of each shaft 294 having a bevel gear 303 affixed thereto for meshing engagement with opposite sides of the bevel gear 101 of the drive shaft 100. As will be understood, this arrangement causes the bevel gear 101 to impart opposite rotational movement to each bevel gear 303 and in turn to each shaft 294. Accordingly, the link arms 92 in this connecting arrangement 224 are affixed to their respective shafts 294 at the same location about the rotational axes thereof rather than at a 180 degree spacing as in the embodiment of FIG. 2. Differential gear arrangements 293 of this type are readily available commercially and offer the advantages of permitting a more compact arrangement of the link arms 92 and eliminating any problems of obtaining sufficient ground clearance of the connecting arrangement.

Figure 4:
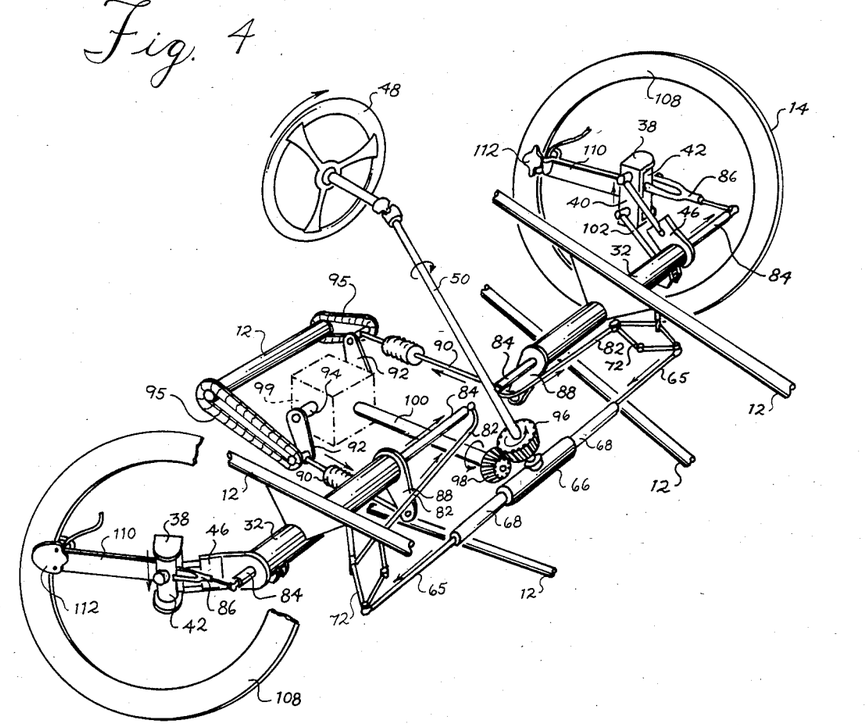
FIG. 4 is a detailed perspective view similar to FIG. 2 showing the steering and suspension system thereof in a leaning disposition.
Figure 5:
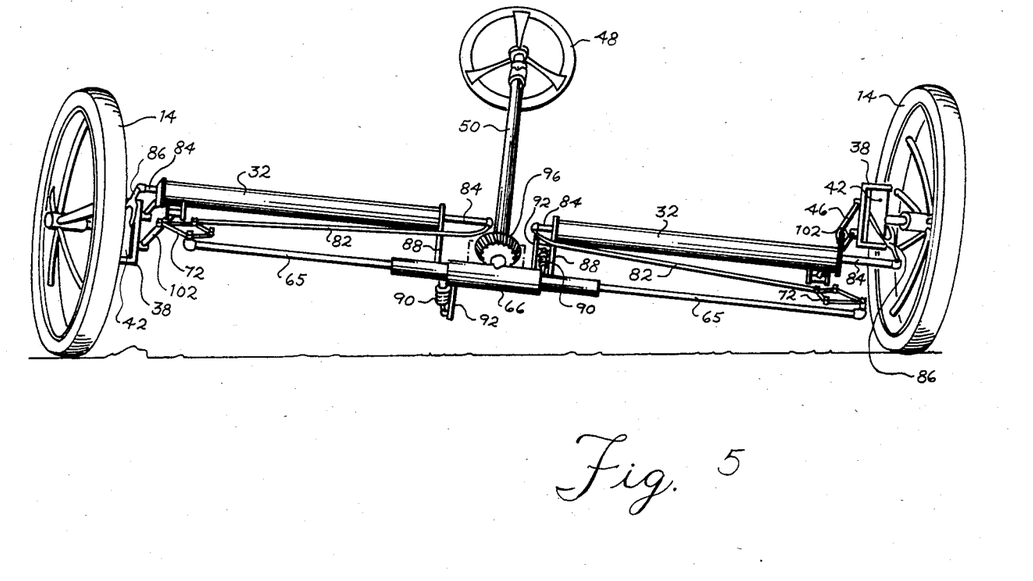
FIG. 5 is a front elevational view of the steering and suspension system in the leaning disposition of FIG. 4.

Referring now to FIGS. 2 and 4-7, the operation of the described mechanical components of the steering and suspension system 20 will be best understood. As seen in FIG. 2, the shaft 94, the crank arms 92, the shock absorbers 90, and the link arms 88 of the connecting arrangement 24 are normally disposed in a resting or equilibrium condition with the link and crank arms 88,92 substantially vertically oriented to act through the rotatable tubes 34 to locate the support assemblies 22 in corresponding pivotal dispositions whereat the wheels 14 are at substantially the same vertical disposition relative to the vehicle frame 12. As seen in FIGS. 4 and 5, upon steering rotation of the steering wheel 48 in either one of its reciprocal directions, the steering linkage 26 produces a corresponding rotation of the steering shafts 50 longitudinal movement of the rack 68, pivotal movement of the truss 72, and synchronous longitudinal movements of the tie rods 82 and the sliding rods 84 within the tubes 34 in the same direction as one another and the same direction as the steering wheel 48 to act via the clevises 86 to turn the wheels 14 about their vertical axes defined by the respective upright shafts 42 of the upright support members 38. Simultaneously, rotation of the steering shaft 50 operates via the driving gear arrangement 93 and its gears 96,98 and the drive shaft 100 and bevel gears 101,103 of the right angle drive assembly 93 to actuate corresponding rotation of the shaft 94 which in turn acts through the integrally rotating crank arms 92 to produce longitudinal movements of the shock absorbers 90 oppositely to one another, rotational movements of the link arms 88 and the tubes 34 oppositely to one another, and vertical movements of the support arms 46, the upright support members 38 and the wheels 14 oppositely to one another to elevate the wheel 14 inwardly of the direction of vehicle turning and to lower the wheel 14 outwardly thereof, thereby causing vehicle leaning toward the direction of the turning of the vehicle. Directional arrows in FIG. 4 indicate all such movements of the components of the steering linkage 26, the actuating arrangement 28, the connecting arrangement 24, and the support assemblies 22. As will be understood, the reciprocal rotational movement of the steering wheel 48 to return it and the other components of the steering linkage 26 to their original positions effects reverse movements of all of the described components. The bungee cords 95, which necessarily were stretched during the aforedescribed movements of their crank arms 92 serve to urge the crank arms 92 and the remaining components of the connecting arrangement 24 and the support assemblies 22 to return to their original positions, thereby aiding in such reverse movements of these components. Further rotational movement of the steering wheel 48 in the opposite direction to that above-described past the original centered disposition actuates the same but opposite movements of all of the described components to effect vehicle turning and leaning in the other direction. Through the actuating arrangement 28, the degree of vehicle leaning achieved by the connecting arrangement 24 is proportional in all cases to the degree of the vehicle turning.

Figure 6:
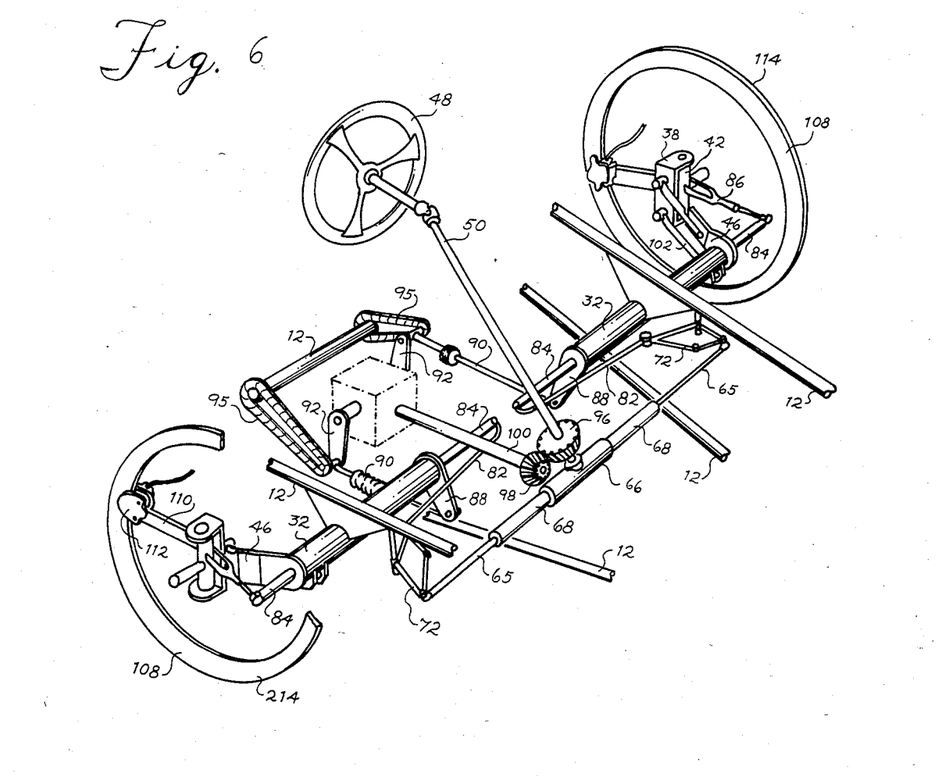
FIG. 6 is a detailed perspective view similar to FIG. 2 showing the steering and suspension system thereof with the wheels in independently moved dispositions.
Figure 7:
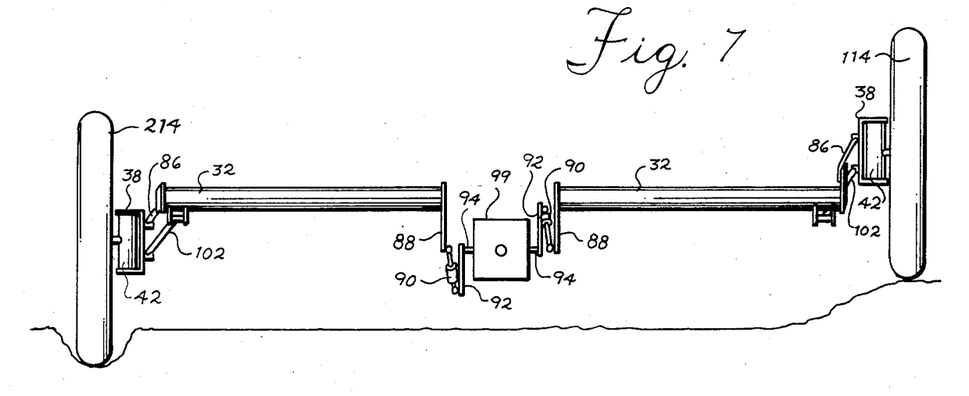
FIG. 7 is a front elevational view of the suspension portion of the steering and suspension system with the wheels in the independently moved dispositions of FIG. 6.

As best seen in FIGS. 6 and 7, when either of the steerable wheels 14 encounters a non-level area of a road surface, the shock absorbers 90 permit independent pivotal movements of the support assemblies 22 to maintain the wheels 14 in proper contact with the road surface with minimal vertical movement of the vehicle frame 12. More specifically, as illustrated by the wheel 114, when one of the steerable wheels 14 encounters a more elevated road area, e.g. a bump or the like, the elevated road area acts on the wheel 114 to move it and its associated upright support assembly 38 and its support arm 46 upwardly, thereby rotating the associated tube 34 correspondingly and rotating the associated link arm 88 rearwardly. The associated crank arm 92 and the connecting shaft 94 will be unmoved and therefore act essentially as part of the vehicle frame to resist the rearward movement of the associated shock absorber 90 with the link arm 88, which results in the shock absorber 90 being compressed to yield to the induced upward movement of the wheel 114 with little, if any, change being effected in the horizontal condition of the frame 12. Upon travel of the vehicle past the elevated area, the shock absorber 90 acts in reverse through the link arm 88, the tube 34, the support arm 46, and the upright support member 38 to move the wheel 114 downwardly to return it to its original disposition relative to the frame 12 to relieve the additional compressive stress on the shock absorber 90 and to maintain the wheel 114 in proper road contact. Similarly, as illustrated by the wheel 214, when one of the steerable wheels 14 encounters a depressed road area, e.g. a pot hole or the like, a lowered resistance to the preloaded compressive stress on the associated shock absorber 90 exists which permits the shock absorber 90 to act through its associated link arm 88, tube 34, support arm 46 and upright support member 38 to unload a corresponding amount of the preloaded compressive stress on the shock absorber 90 producing a corresponding pivotal movement of the wheel 214 downwardly to move it into contact with the depressed road area, again with little change in the horizontal condition of the vehicle frame 12. Upon travel of the vehicle past the depressed area, the wheel 214 is moved upwardly by the more elevated road surface and acts through the associated upright support member 38, support arm 46, tube 34 and link arm 88 to recompress the shock absorber 90. As will further be understood, each shock absorber 90 acts throughout all such biasing expansional and contractional movements to dampen the independent movements of the support assembly 22 to prevent bouncing and rebounding of the wheels 14 upon encountering elevated and depressed road surfaces, thereby to achieve more stable maintenance of the wheels 14 in proper road contact.

Each support assembly 22 also preferably includes a trailing idler arm 102 pivotably affixed at one of its ends between a pair of mounting brackets welded to the lower side of the tubular housing 32 and extending therefrom in substantially parallel relation with the respective support arm 46 with the opposite end of the idler arm 102 pivotably affixed to the upright bracket 40 directly below the pivotal mounting of the support arm 46. In this manner, each support assembly 22 essentially forms a parallelogram between its idler arm 102, its upright bracket 40, its support arm 46, and its tubular housing 32 and cylindrical tube 34. Thus, during vertical movements of each wheel 14, the associated idler arm 102 moves in substantially parallel relation to the associated support arm 46 to constrain the upright support member 38, and particularly the upright shaft 42 thereof, to remain in the same substantially vertical disposition as in the normal equilibrium position aforedescribed, whereby the caster angle of the wheels 14 is maintained substantially constant during both independent and leaning vertical movements of the wheels 14. As will be understood, the connection of the upright support members 38 through the support arms 46 and the idler arms 102 to the rotatable tubes 34 and the tubular housing 32, which are rigidly fixed to the vehicle frame 12, constrains the upright support members 38 and the wheels 14 to assume a camber angle substantially equivalent to the degree of leaning, or non-leaning, of the frame 12 throughout the afore-described operation of the steering and suspension system 20.

Each of the wheels 14 is preferably provided with outwardly arched spokes 104 merging at a central axial hub 106 to locate the hub 106 at a vertical offset from the circular, road-engaging periphery of the wheel 14. The arching spokes 104 and the offset hub 106 are selected to achieve location of the vertical steering axes of the upright vertical shafts 42 substantially co-planarly with the road-engaging peripheries of the steerable wheels 14 to obtain the known advantages of center line wheel steering. Each steerable wheel 14 is also provided with a braking rim 108 in the form of an annular flange which extends radially inwardly from the outer periphery of the wheel 14. A disc brake-type caliper assembly 110 is mounted on and extends rearwardly from the upright shaft 42 of each steerable wheel 14, each caliper assembly 110 having a set of pivoted jaws 112 operable to be opened and closed remotely by the vehicle operator through a Bowden cable 114 affixed at one of its ends to the jaws 112 and at the other of its ends to a brake pedal (not shown) or other manually operable actuator for selectively closing the jaws 112 into frictional braking engagement with the flange 108 to slow or prevent rotational movement of the wheels 14. This application of braking force to the wheels 14 more radially outwardly from their rotational axes than with conventional center-mounted disc brakes produces a reduction of the closing pressure required to be applied to caliper assemblies 110 over that necessary with conventional disc brake arrangements to achieve corresponding amounts of frictional braking force and further results in a reduction of the application of stress during braking to the wheel hubs 106. Additionally, the radially-outwardly located brake flanges 108 will be understood to be subjected to greater centrifical forces during rotation of the wheels 14 than are ordinary center-mounted brake discs, which aids in maintaining the flanges 108 free of dirt and other debris which can inhibit the performance of the brake assemblies.

Figures 8, 9:
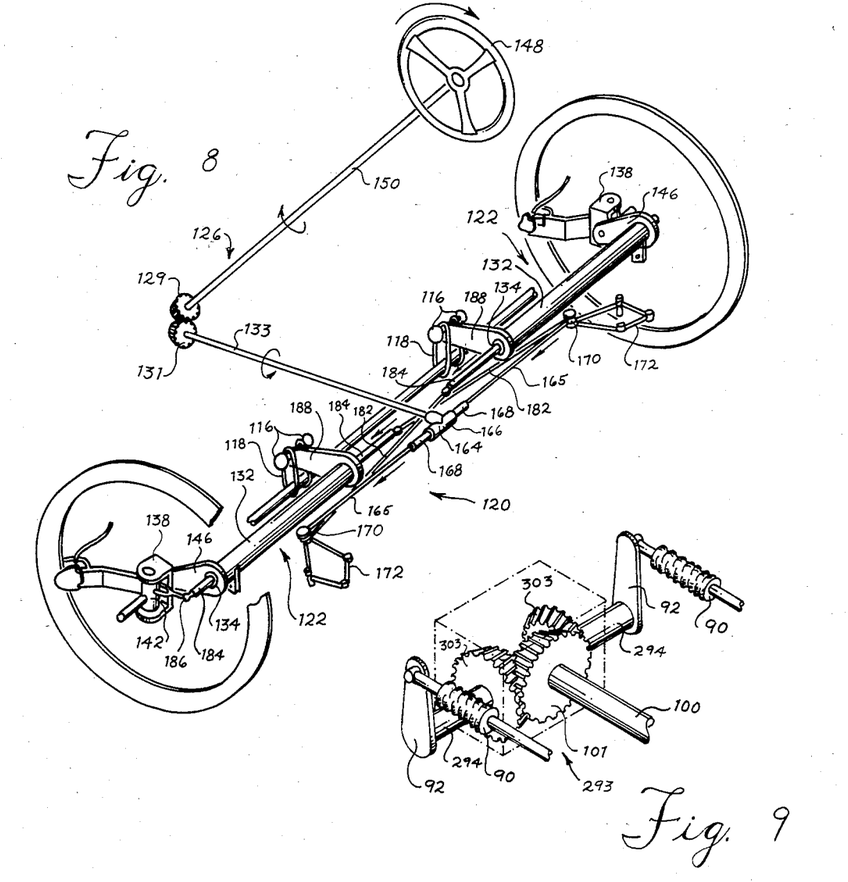
FIG. 8 is a detailed perspective view of a steering and suspension system according to another embodiment of the present invention.

Referring now to FIG. 8, an alternate embodiment of a steering and suspension system according to the present invention is indicated generally at 120. The steering and suspension system 120 includes a pair of wheel support assemblies 122 constructed and arranged in similar fashion to the support assemblies 22 described above. Each support assembly 122 utilizes a frame-mounted tubular housing 132 with a co-axially-supported cylindrical tube 134 rotatable therein and carrying a forwardly-extending leading wheel support arm 146 on which an upright support member 138 is mounted for carrying a respective wheel 14 for rotational and turning movements. A link arm 188 is rigidly affixed to the inward end of each rotatable tube 134, but the link arms 188 are not connected in any way to one another to provide frame-leaning capability to the steering and suspension system 120. Each link arm 188 extends forwardly from its associated tube 134 and has a pair of spool members 116 affixed to each side of the free end of the link arm 188. Elastic bungee cords 118 are trained about the spool members 116 of each link arm 188 and about a cross member of the vehicle frame 12 to provide independent biasing support of each steerable wheel 14 to urge the support assemblies 122 and the steerable wheels 14 into equilibrium positions with respect to the vehicle frame 12 and to maintain the wheels 14 in proper road contact by absorbing and dampening shocks resulting from elevated and depressed road areas and similar road undulations.

The steering and suspension system 120 also includes a steering linkage 126 of a similar construction and arrangement to the steering linkage 26 described above. The steering linkage 126 includes a steering wheel 148 rigidly affixed to a first steering shaft 150 rotatably journaled in the vehicle frame 12. A toothed gear 129 is affixed rigidly to the extending end of the steering shaft 150 for rotation therewith and meshes with a bevel gear 131 fixed to a second steering shaft 133 which is supported rotatably on the vehicle frame 12 to extend horizontally rearwardly from the steering shaft 150. The rearward end of the second steering shaft 133 extends into the housing 164 of a conventional rack and pinion unit 166 fixedly welded transversely centrally to the vehicle frame (not shown in FIG. 8), and is fixed to the pinion gear (not shown) of the rack and pinion unit 166. The rack 168 of the rack and pinion unit 166 has extension rods 165 fixed to its opposite ends, the extension rods 165 being pivotably affixed respectively by ball and socket connections 170 to the forward apexes of a pair of double-armed trusses 172 pivotably mounted to opposite longitudinal sides of the vehicle frame 12 rearwardly of the support assemblies 122. The forward apexes of the trusses 172 are also pivotably affixed to respective tie rods 182 which extend from the trusses 172 and are pivotably affixed respectively to the inwardly-extending ends of cylindrical steering actuating rods 184 coaxially supported slidably within the rotatable tubes 134, substantially the same as the rods 84 described above. Each rod 184 is affixed to the upright shaft 142 of the respective upright support member 138 by forwardly-extending steering knuckles 186. In this manner, reciprocal rotational movements of the steering wheel 48 actuate corresponding longitudinal reciprocal movements of the rack 168 to correspondingly move longitudinally the tie rods 182 and the steering rods 184 synchronously and in the same direction as one another oppositely to the direction of rotation of the steering wheel 148 so as to effect turning movement of the wheels 14 in the same direction as that of the steering wheel 148, all as is shown by the directional arrows in FIG. 8.

It is also to be understood that either of the embodiments of FIGS. 2 and 8, as well as any other embodiments of the present invention, may be designed to employ a wheel support arm arrangement of either the leading or trailing arm type. Thus, while the lean-inducing embodiment of FIG. 2 is illustrated and described as utilizing trailing support arms 46, leading support arms may be equally well employed. Similarly, trailing support arms may be utilized in the embodiment of FIG. 8 instead of the leading support arms 146. As will be understood, it would be necessary in making any such substitution only to rearrange or change the rack-and-pinion unit 66,166 to reverse its actuation of movement of the rack 68,168 in relation to turning movements of the steering wheel 48,148.

Each of the steering and suspension systems 20 and 120 provide substantial advantages in mechanical simplicity, compactness and weight reduction over conventional vehicle steering and suspension systems. These advantages are principally provided by the novel concentric arrangement of a cylindrical tubular support housing 32,132, a cylindrical tube 34,134 co-axially supported rotatably therewithin, and a cylindrical rod 84,184 co-axially supported slidably therewithin to provide wheel support, suspension and steering capabilities in each of the steering and suspension systems 20,120 and to additionally provide for vehicle leaning in the first-described embodiment of FIGS. 1-7. As a direct result of this unique construction, only a minimum number of components requiring a bare minimum amount of space must extend outwardly of the confines of the vehicle frame to achieve the necessary operative connection of the steering and suspension systems 20,120 with the supported steerable wheels 14, whereby the steering and suspension systems 20,120 permit substantially without restriction the adaptation of a wide and varying range of aerodynamic body styles and shapes to vehicles incorporating the present steering and suspension systems 20,120. Furthermore, the remaining components of the steering and suspension systems 20,120 are mechanically uncomplex and themselves compactly arranged to admit of additional savings in space and reduction in weight.

The ready adaptability of the present steering and suspension system in embodiments either providing or not providing for the inducement of vehicle leaning in relation to vehicle turning enables the present invention to be utilized in some embodiment in substantially any type of motor vehicle application. Particularly, the lean-inducing capability of the present steering and suspension system, together with the aforementioned advantages of mechanical simplicity, compactness and weight reduction in the steering and suspension system, makes possible the development of an extremely lightweight vehicle without either undue reduction in the size thereof and further without compromise of the handling characteristics and stability thereof in comparison to conventional motor vehicles, but in fact actually permitting significant improvement in vehicle handling and suspension stability. Specifically, the arrangement of the wheel support assemblies 22 to effect leaning by upward and downward pivotal movement of the support arms 46 in respective planes which extend longitudinally, rather than transversely, of the vehicle frame, effectively maintains the spindles 44 and the supported wheels 14 in substantially the same disposition transversely relative to the frame during the full range of leaning operation of the steering and suspension assembly 20. As a result, the present steering and suspension system is capable of turning operation in acordance with the well-known Ackerman Principle to prevent transverse, or sidewise, scrubbing of the wheels 14 during vehicle turning. Such wheel scrubbing problems are common in lean-inducing steering and suspension systems wherein the wheel supports are pivoted upwardly and downward in planes transversely-oriented relative to the vehicle frame, since such systems effect transverse movement of the wheels relative to the vehicle frame during turning. The centerline steering of the wheels provided in each embodiment of the present steering and suspension system will be understood to further aid in preventing transverse wheel scrubbing during vehicle turning.

The present invention has been described and illustrated herein in regard to its preferred embodiment in a three-wheeled vehicle. However, it will be readily recognized by those persons skilled in the art that the present invention may be equally well adapted and employed in many other automotive motor vehicles, particularly conventional four-wheel personal passenger vehicles, without departing from the substance and scope of the present invention. Accordingly, the present invention is not limited to the particular emboodiments thereof herein illustrated and described, the foregoing disclosure having been made solely for purposes of illustration and to provide an enabling disclosure of the present invention to those persons skilled in the art. Any and all adaptations, modifications, variations and equivalent arrangements of the present invention that would be apparent or reasonably suggested by the foregoing disclosure to those persons skilled in the art is considered to be within the scope of the present invention which is to be limited only by the claim appended hereto and equivalents thereof.

I claim:

1. In a wheeled vehicle of the type having a vehicle frame, two steerable wheels mounted on opposite transverse sides of said frame, and at least one wheel mounted on said frame at a longitudinal spacing from said steerable wheels, an improved steering and suspension means for said steerable wheels of said vehicle comprising:
   (a) respective support means for said steerable wheels pivotably mounted independently at said opposite sides of said frame about respective generally horizontal axes, each said support means including tube means rotatably supported generally horizontally on said frame to define the respective said horizontal axis and support arm means fixed to said tube means and operably connected to the respective said steerable wheel for vertical movement of said support arm means and the respective said steerable wheel integrally with rotational movement of said tube means;
   (b) respective resilient biasing means affixed independently to said tube means for movement integrally with rotation thereof and operatively connected to said frame for urging the respective said support means and the respective said steerable wheel into an equilibrium position vertically with respect to said frame and for yielding to permit independent pivotal movement of the respective said support means and corresponding vertical movement of the respective said steerable wheel; and
   (c) steering means for controlling synchronous corresponding turning movement of said steerable wheels about respective generally vertical axes generally perpendicular to said horizontal axes, said steering means including connecting means operatively connected respectively to said steerable wheels for reciprocatory movement for actuating said turning movement thereof, said connecting means including rod means supported co-axially within said tube means for longitudinal reciprocal movement therein for actuating said turning movement of said steerable wheels.

2. The improvement in a wheeled vehicle according to claim 1 and characterized further in that each said support means includes tubular housing means fixed to said frame and rotatably supporting said tube means co-axially within said tubular housing means.

3. The improvement in a wheeled vehicle according to claim 1 and characterized further in that each said resilient biasing means includes link means fixed to the respective said tube means to move rotatably therewith and elastic bungee cord means extending between said link means and said frame for urging said link means into said equilibrium position and for expansion and contraction upon opposite rotational movements of said link means during opposite vertical movements of the respective said steerable wheel.

4. The improvement in a wheeled vehicle according to claim 1 and characterized further in that each said resilient biasing means includes link means fixed to the respective said tube means to move rotatably therewith and shock absorber means operatively connected to and extending between said link means and said frame for urging said link means into said equilibrium position and for extension and compression upon opposite rotational movements of said link means during opposite vertical movements of the respective said steerable wheel.

5. The improvement in a wheeled vehicle according to claim 1 and characterized further by frame leaning means operatively connected respectively to each said resilient biasing means for reciprocatory movement for actuating opposed pivotal movements of said support means and corresponding opposed vertical movements of said steerable wheels, and actuating means operatively associating said frame leaning means and said steering means for actuation of said reciprocatory movement of said frame leaning means upon said turning movement of said steerable wheels to actuate said opposed vertical movement thereof proportionately to the degree of said turning to effect upward movement of said steerable wheel inwardly of the direction of turning and equivalent downward movement of the other said steerable wheel, whereby said steerable wheels are independently supported biasingly for independent movement relative to said frame while, during turning of said vehicle, said frame is caused to lean in the direction of turning proportionately to the degree of turning.

6. The improvement in a wheeled vehicle according to claim 5 and characterized further in that each said support means is arranged for vertical movement of the respective said support arm means in a plane extending generally longitudinally of said frame to maintain the respective said steerable wheel in substantially the same disposition transversely relative to said frame during vehicle leaning to provide Ackerman principle steering during vehicle turning and leaning.

7. The improvement in a wheeled vehicle according to claim 5 and characterized further in that said frame leaning means includes a pair of crank arm means rotatably supported co-axially with one another and respectively affixed to said biasing means for actuating reciprocal movements thereof, and interconnection means rotatably mounted on said frame and affixed respectively to said crank arm means for integral rotation thereof for actuating opposed movements of said biasing means to actuate corresponding opposed rotational movements of said tube means.

8. The improvements in a wheeled vehicle according to claim 7 and characterized further in that each said resilient biasing means includes link arm means rigidly affixed to the respective said tube means to move rotatably therewith and shock absorber link means affixed pivotably at one end thereof to said link arm means and pivotably affixed at the other end thereof to the respective said crank arm means for generally longitudinal reciprocal movements of said shock absorber link means upon corresponding rotational movements of said interconnecting means to actuate said rotational movements of the respective said tube means.

9. The improvements in a wheeled vehicle according to claim 7 and characterized further in that said steering means includes a steering member for rotational turning operation by an operator of said vehicle, rotatable shaft means operably connected with said steering member for reciprocal rotational movements upon corresponding rotational movements of said steering member, rack and pinion means operatively connected with said shaft means for longitudinally reciprocal movements upon corresponding rotational movements of said shaft means, and tie rod means pivotably affixed to said rack and pinion means and to each said rod means for actuating corresponding longitudinally reciprocal movement thereof upon corresponding longitudinal movements of said rack and pinion means, and characterized further in that said actuating means includes drive means operatively connecting said shaft means and said interconnecting means for synchronous rotational movement thereof to actuate said opposed movement of said biasing means upon steering rotation of said shaft means.

10. A improvement in a wheeled vehicle according to claim 1 and characterized further in that each said support arm means includes a first support arm rigidly affixed to the respective said tube means and operatively connected pivotably with the respective said steerable wheel and includes idler arm means pivotably connected with said frame and operatively connected pivotably with the respective said steerable wheel to maintain the caster thereof substantially constant during said upward and downward movements thereof.

11. The improvement in a wheeled vehicle according to claim 1 and characterized further in that said rod means includes a pair of steering rods respectively supported slidably with said tube means, and characterized further in that said steering means includes a steering member for rotational turning operation by an operator of said vehicle, shaft means operably connected with said steering member for reciprocal rotational movements of said shaft means upon corresponding rotational turning movements of said steering member, rack and pinion means operatively connected with said shaft means for longitudinally reciprocal movements upon corresponding rotational movements of said shaft means, and tie rod means affixed to said rack and pinion means and to each said rod means for actuating said opposed longitudinal movement thereof upon steering rotation of said steering member.

12. The improvement in a wheeled vehicle according to claim 1 and characterized further by means for braking rotation of said steerable wheels, said braking means including an annular flange on each said steerable wheel and caliper means associated with each said flange for selective movement into and out of frictional gripping engagement therewith for selectively slowing or preventing rotation of said steerable wheels.

13. The improvement in a wheeled vehicle according to claim 1 and characterized further in that each said support means is arranged to orient the respective said steerable wheel coplanarly with the respective said vertical turning axis therefor to prevent wheel scrubbing transversely during vehicle turning.

14. In a three-wheeled vehicle of the type having a vehicle frame, two steerable wheels mounted on opposite transverse sides of said frame, and one wheel mounted on said frame at a longitudinal spacing from said transverse wheels, an improved steering and suspension means for said steerable wheels of said vehicle adapted to induce leaning of said frame during turning of said vehicle, comprising:

(a) respective support means for said steerable wheels pivotably mounted independently at said opposite sides of said frame generally co-axially about a generally horizontal axis extending transversely of said frame, each said support means including tubular housing means rigidly fixed transversely to said frame at the respective said side thereof about said axis, tube means rotatably supported co-axially within said tubular housing means to define said axis, and support arm means fixed to said tube means to move rotatably therewith in a generally vertical path and operably connected with the respective said steerable wheel for vertical movement of said support arm means and the respective said steerable wheel integrally with rotational movement of said tube means;

(b) connecting means affixed respectively to each said support means and arranged for reciprocatory movement for actuating opposed, substantially equal pivotal movements of said support means and corresponding opposed vertical movements of said steerable wheels for inducing leaning of said frame and for yieldably permitting independent pivotal movement of said support means relative to said frame, said connecting means including a pair of link arm means each rigidly affixed to a respective one of said tube means, a pair of shock absorber link means each pivotably affixed at one end thereof to a respective one of said link arm means, a pair of crank arm means each pivotably affixed to a respective one of said shock absorber link means, and first shaft means rotatably mounted on said frame and rigidly affixed with each of said crank arm means at a substantially one hundred eighty degree spacing about the rotational axis of said first shaft means, said shock absorber link means being operative for urging said support means and said steerable wheels into an equilibrium position vertically with respect to said frame and for yielding independently to permit independent pivot movement of said support means and corresponding vertical movement of said steerable wheels;

(c) steering means for controlling synchronous corresponding turning movement of said steerable wheels about respective generally vertical axes generally perpendicular to said horizontal axis, said steering means including a steering member for rotational turning operation by an operator of said vehicle, second shaft means rotatably supported on said frame and operably connected with said steering member for reciprocal rotational movements upon corresponding rotational movements of said steering member, rack and pinion means operatively connected with said second shaft means for longitudinally reciprocal movements upon corresponding rotational movements of said second shaft means, tie rod means pivotably affixed to said rack and pinion means for longitudinally reciprocal movements transversely of said frame and generally parallel with said horizontal axis upon corresponding reciprocal movements of said rack and pinion means, and a pair of rod means each slidably supported co-axially within a respective one of said tube means and affixed at the transversely inward end thereof to said tie rod means and operatively connected at the transversely outward end thereof to a respective one of said steerable wheels for synchronous longitudinal reciprocal movements of said rod means upon corresponding longitudinal reciprocal movement of said tie rod means for actuating said turning movement of said steerable wheels; and (d) actuating means operatively associated said connecting means and said steering means for actuation of reciprocatory movement of said connecting means upon said turning movement of said steerable wheels by said steering means to actuate said opposed vertical movement of said steerable wheels proportionately to the degree of said turning to effect upward movement of said steerable wheel inwardly of the direction of turning and equivalent downward movement of the other said steerable wheel, said actuating means including gear drive means drivingly interconnecting said first shaft means and on said second shaft means for synchronous rotational movement thereof to actuate said reciprocal movements of said connecting means upon corresponding turning movements of said steering means, whereby said steerable wheels are independently supported biasingly for independent vertical movement relative to said frame while, during turning movement of said vehicle, said frame is caused to lean in the direction of turning proportionately to the degree of turning.

15. The improvement in a three-wheeled vehicle according to claim 14 and characterized further in that each said support arm means includes a first support arm rigidly affixed to the respective said tube means and operatively connected pivotably with the respective said steerable wheel and includes idler arm means pivotably connected with said frame and operatively connected pivotably with the respective said steerable wheel to maintain the caster thereof substantially constant during said upward and downward movements thereof.

16. The improvement in a three-wheeled vehicle according to claim 14 and characterized further by means for braking rotation of said steerable wheels, said braking means including an annular flange on each said steerable wheel and caliper means associated with each said flange for selective movement into and out of frictional gripping engagement therewith for selectively slowing or preventing rotation of said steerable wheels.

17. The improvement in a three-wheeled vehicle according to claim 14 and characterized further in that each said support means is arranged for vertical movement of the respective said support arm means in a plane extending generally longitudinally of said frame to maintain the respective said steerable wheel in substantially the same disposition transversely relative to said frame during vehicle leaning to provide Ackerman principle steering during vehicle turning and leaning.

18. The improvement in a three-wheeled vehicle according to claim 14 and characterized further in that each said support means is arranged to orient the respective said steerable wheel coplanarly with the respective said vertical turning axis therefor to prevent wheel scrubbing transversely during vehicle turning.

19. In a three-wheeled vehicle of the type having a vehicle frame, two steerable wheels mounted on opposite transverse sides of said frame, and one wheel mounted on said frame at a longitudinal spacing from said transverse wheels, an improved steering and suspension means for said steerable wheels of said vehicle, comprising:

(a) respective support means for said steerable wheels pivotably mounted independently at said opposite sides of said frame generally co-axially about a generally horizontal axis extending transversely of said frame, each said support means including tubular housing means rigidly fixed transversely to said frame at the respective said side thereof about said axis, tube means rotatably supported co-axially within said tubular housing means to define said axis, and support arm means fixed to said tube means to move rotatably therewith in a generally vertical path and operably connected with the respective said steerable wheel for vertical movement of said support arm means and the respective said steerable wheel integrally with rotational movement of said tube means;

(b) respective resilient biasing means affixed independently to said tube means to move rotatably therewith and operatively connected to said frame for urging the respective said support means and the respective said steerable wheels into an equilibrium position vertically with respect to said frame and for yielding to permit independent pivotal movement of the respective said support means, each said biasing means including link means rigidly affixed to the respective said tube means to move rotatably therewith and elastic bungee cord means extending between said link means and said frame for urging said link means into said equilibrium position and for expansion and contraction upon rotational movements of said link means during corresponding opposite vertical movements of the respective said steerable wheel; and (c) steering means for controlling synchronous corresponding turning movement of said steerable wheels about respective generally vertical axes generally perpendicular to said horizontal axis, said steering means including a steering member for rotational turning operation by an operator of said vehicle, shaft means operably connected with said steering member for longitudinal reciprocal rotational movements of said shaft means upon corresponding rotational turning movements of said steering member, rack and pinion means operably connected to said shaft means for longitudinally reciprocal movements transversely of said frame and generally parallel with said horizontal axis upon corresponding rotational movements of said shaft means, tie rod means affixed to said rack and pinion means for longitudinal reciprocal movements therewith, and a pair of rod means each slidably supported co-axially within a respective one of said tube means and affixed at the transversely inward end thereof to said tie rod means and operatively connected at the transversely outward end thereof to a respective on of said steerable wheels for synchronous corresponding longitudinal reciprocal movements of said rod means upon corresponding longitudinal reciprocal movements of said tie rod means for actuating said turning movement of said steerable wheels.

20. The improvement in a three-wheeled vehicle according to claim 19 and characterized further in the each said support arm means includes a first support arm rigidly affixed to the respective said tube means and operatively connected pivotably with the respective said steerable wheel and includes idler arm means pivotably connected with said frame and operatively connected pivotably with the respective said steerable wheel to maintain the caster thereof substantially constant during said upward and downward movements thereof.

21. The improvement in a three-wheeled vehicle according to claim 19 and characterized further by means for braking rotation of said steerable wheels, said braking means including an annular flange on each said steerable wheel and caliper means associated with each said flange for selective movement into and out of frictional gripping engagement therewith for selectively slowing or preventing rotation of said steerable wheels.

22. The improvement in a three-wheeled vehicle according to claim 19 and characterized further in that each said support means is arranged to orient the respective said steerable wheel coplanarly with the respective said vertical turning axis therefor to prevent wheel scrubbing transversely during vehicle turning.

* * * * *

UNITED STATES PATENT OFFICE
CERTIFICATE OF CORRECTION

Patent No. 4,600,216        Dated July 15, 1986

Inventor(s) Dennis Lee Burkholder

It is certified that error appears in the above-identified patent and that said Letters Patent are hereby corrected as shown below:

Col. 3, Line 68, between "frictional" and "engagement" insert — gripping — .

Col. 8, Line 15, delete "gear" and insert therefor — gears — .

Col. 17, Line 21, delete "pivot" and insert therefor — pivotal — .

Col. 17, Line 54, delete "associated" and insert therefor — associating — .

Col. 20, Line 9, delete "the" and insert therefor — that — .

Signed and Sealed this

Fifth Day of January, 1988

Attest:

DONALD J. QUIGG

Attesting Officer      Commissioner of Patents and Trademarks